US007672588B2

(12) United States Patent
Dorgeuille et al.

(10) Patent No.: US 7,672,588 B2
(45) Date of Patent: Mar. 2, 2010

(54) RING OPTICAL TRANSMISSION NETWORK ACCESS NODE

(75) Inventors: François Dorgeuille, Paris (FR); Nicolas Le Sauze, Bures-sur-Yvette (FR); Ludovic Noirie, Nozay (FR); Stefano Beccia, Vimercate (IT)

(73) Assignee: Alcatel Lucent, Paris (FR)

( * ) Notice: Subject to any disclaimer, the term of this patent is extended or adjusted under 35 U.S.C. 154(b) by 537 days.

(21) Appl. No.: 11/614,054

(22) Filed: Dec. 20, 2006

(65) Prior Publication Data

US 2007/0223923 A1  Sep. 27, 2007

(30) Foreign Application Priority Data

Dec. 28, 2005 (EP) .................................. 05301116

(51) Int. Cl.
 *H04B 10/20* (2006.01)
 *G02F 1/00* (2006.01)
(52) U.S. Cl. ............................... 398/59; 398/3; 398/67; 398/82
(58) Field of Classification Search .................. 398/3, 398/7, 43, 57, 59, 83, 67, 72, 79, 82
See application file for complete search history.

(56) References Cited

U.S. PATENT DOCUMENTS 5,548,431 A * 8/1996 Shin et al. .................... 398/59

2002/0181503 A1 12/2002 Montgomery
2004/0264966 A1 12/2004 Lovisa
2005/0025489 A1  2/2005 Aldridge

FOREIGN PATENT DOCUMENTS

EP        0 949 777 A2    10/1999

* cited by examiner

*Primary Examiner*—M. R. Sedighian
(74) *Attorney, Agent, or Firm*—Carmen Patti Law Group, LLC

(57) ABSTRACT

A ring optical transmission network access node (ANi) comprises:
 two identical band splitters (BSa, BSb), each provided with homologous first, second and third ports (Ba, BWa, BPa; Bb, BWb, BPb),
 a first coupler (CW) coupling the second port (BWb) of the second splitter (BSb), on the one hand, to the second port (BWa) of the first splitter (BSa) via a first channel and, on the other hand, to an access point (A2) via a second channel,
 a second coupler (CP) coupling the third port (BPa) of the first splitter (BSa), on the one hand, to the third port (BPb) of the second band splitter (BSb) via a first channel and, on the other hand, to another access point (A1) via a second channel.

Such nodes enable the implementation of a passive ring network comprising only one fiber and in which the coupling ratios of the couplers (CW, CP) are optimized for two opposite traffic propagation directions.

Application in particular to optical fiber metropolitan access networks, with broken fiber protection device.

8 Claims, 2 Drawing Sheets

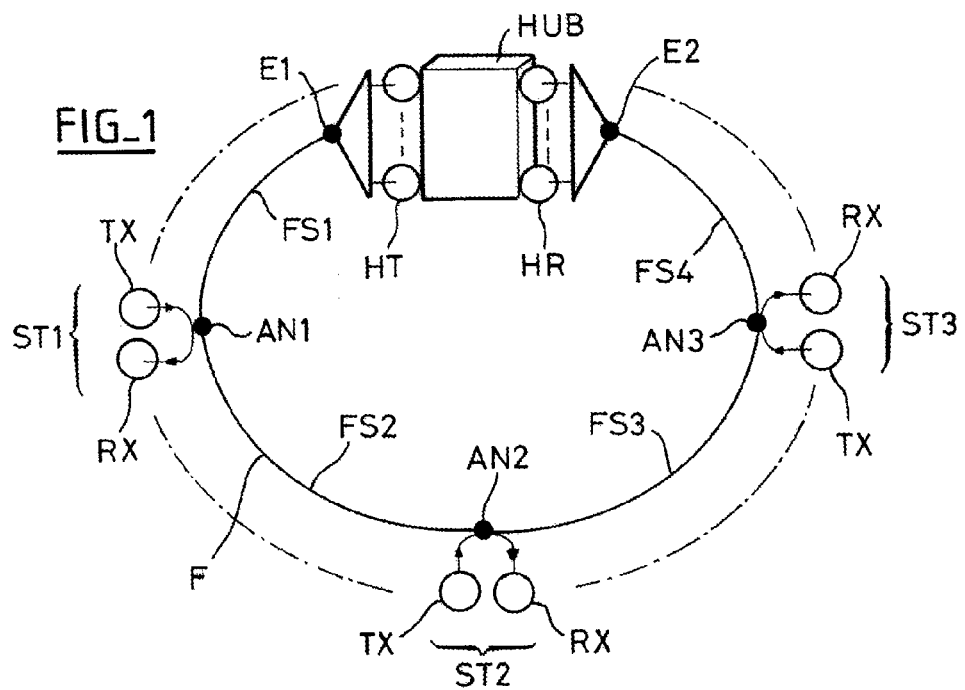
FIG_1
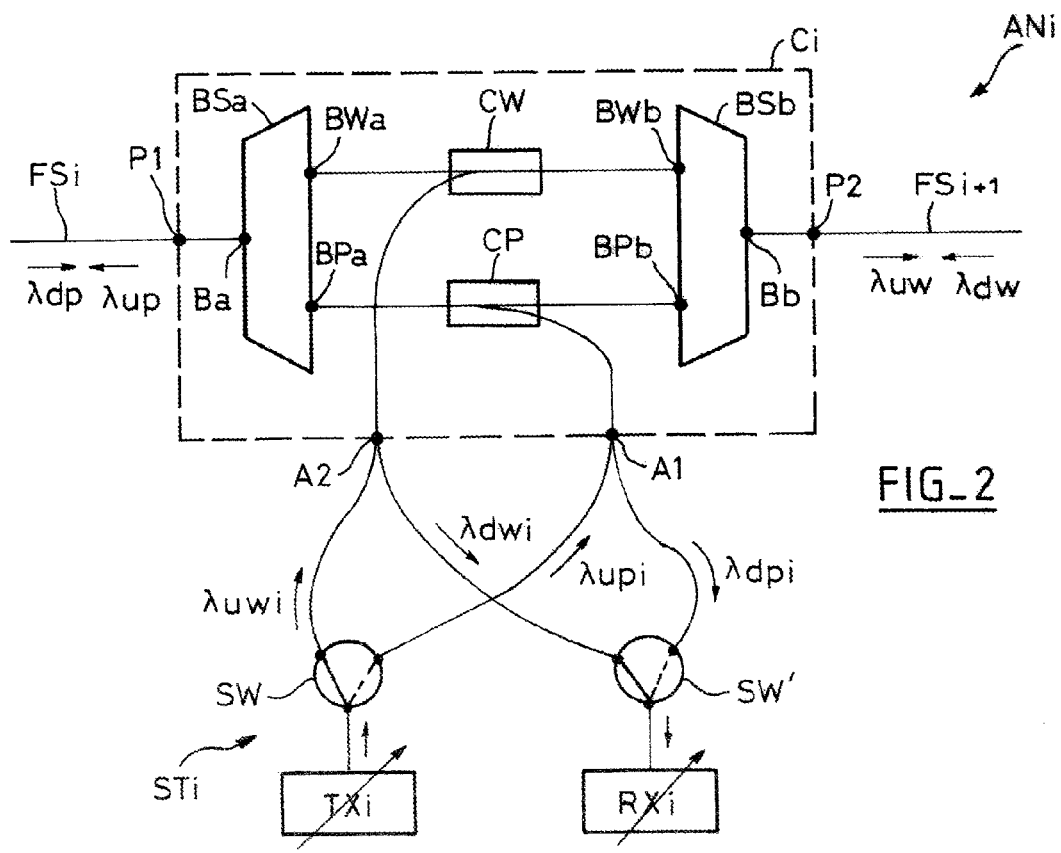
FIG_2

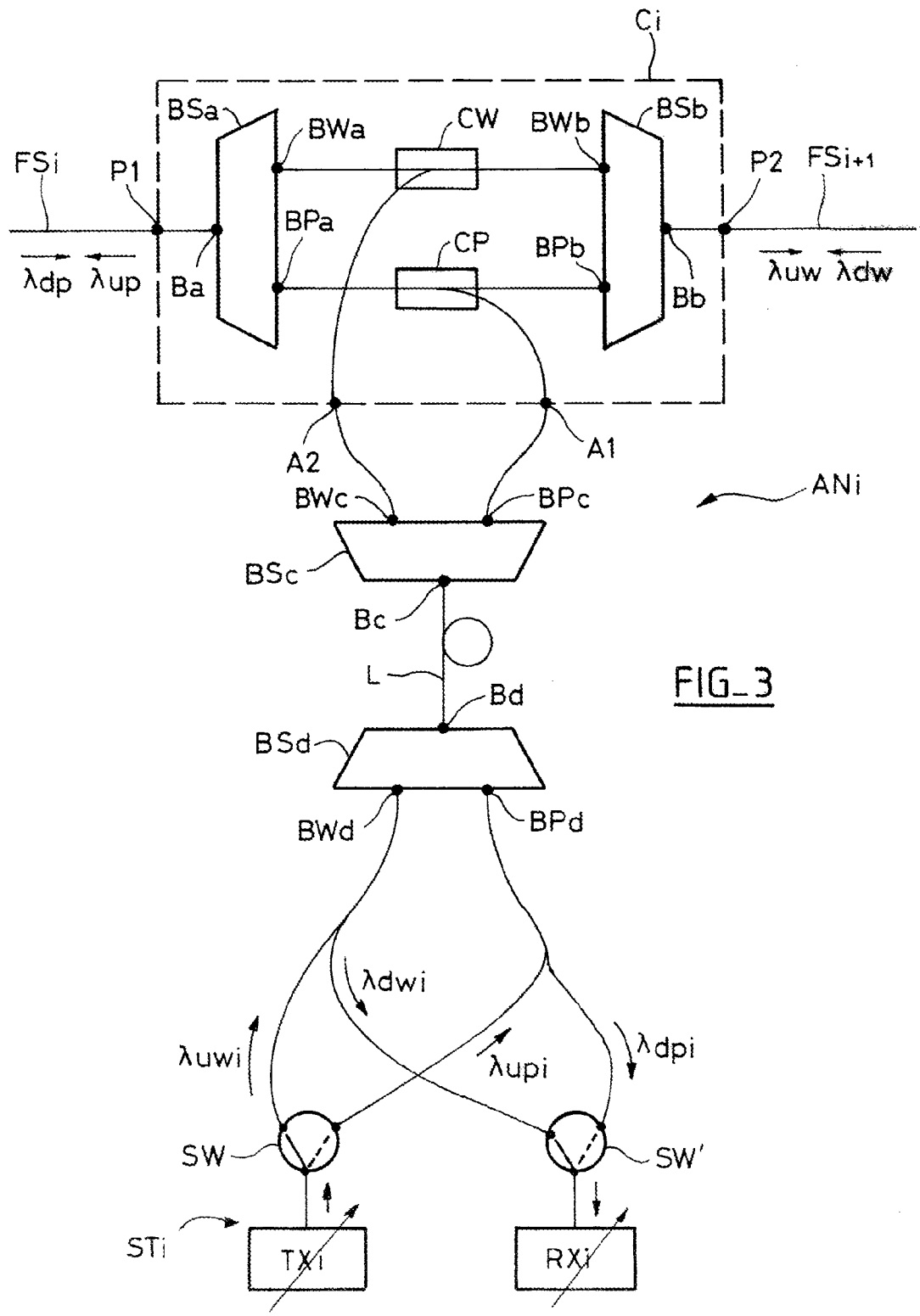
FIG_3

RING OPTICAL TRANSMISSION NETWORK ACCESS NODE

CROSS-REFERENCE TO RELATED APPLICATIONS

This application is based on French Patent Application No. EP05301116.9 filed on Dec. 28, 2006, the disclosure of which is hereby incorporated by reference thereto in its entirety, and the priority of which is hereby claimed under 35 U.S.C. §119.

BACKGROUND OF THE INVENTION

1. Field of the Invention

The field of the invention is optical connection transmission networks. The invention relates more particularly to optical networks adapted to relatively limited geographical dimensions, such as metropolitan access networks.

2. Description of the Prior Art

As a general rule, an optical network consists of a plurality of stations able to send and receive optical signals to and from other stations of the network. These exchanges of information are effected by means of optical connections to which are connected access nodes that serve the respective stations.

To exploit the bandwidth capacity of the optical connections, wavelength division multiplexing (WDM) is advantageously used. Accordingly, the optical connections carry multiplex signals formed of a combination of optical signals each consisting of an optical carrier wave modulated as a function of the information to be sent. Each carrier wave has a specific wavelength that defines a corresponding spectral channel.

Moreover, if the network is of sufficiently limited size, providing devices for individual regeneration of the channels may be avoided. Such a network, which is then referred to as "transparent", may nevertheless include optical amplifiers disposed to amplify simultaneously the channels of the WDM multiplexes transmitted. In the absence of such amplifiers, the network is referred to as "passive".

Accordingly, the field of the invention is that of transparent networks, passive or otherwise.

A first type of prior art transparent WDM network can use a ring configuration. The network then includes, for example, an optical connection one end whereof is coupled to a send interface of a hub and the other end whereof is coupled to a receive interface of the same hub. The hub is also normally adapted to communicate with an external interconnection network.

FIG. 1 represents one example of such a network diagrammatically in the most simple situation where the looped connection consists of a single fiber F to which are coupled access nodes AN1-AN3 for receiver terminals RX and sender terminals TX of associated stations ST1-ST3.

The optical connection therefore consists of a plurality of fiber sections FS1-FS4 separated by the nodes (and where applicable by optical amplifiers, not shown). The connection has a first end E1, called the upstream end, connected to the send interface HT of the hub HUB and a second end E2, called the downstream end, connected to the receive interface HR of the hub.

The send interface HT is provided with a plurality of senders using carrier waves with different send wavelengths. Also, each station includes at least one receive-wavelength-selective receiver. Accordingly, each sender of the hub can inject into the connection a signal of given wavelength and when that signal reaches an access node via the fiber, that signal may be processed by the associated station if it includes a receiver tuned to that wavelength.

Conversely, the receive interface HR of the hub is provided with a plurality of respective receive-wavelength-selective receivers, and each station includes at least one sender TX of given send wavelength. Accordingly, a sender of a station can inject into the connection, toward the second end E2, a signal of given wavelength and when that signal reaches the receive interface, it can be processed by the hub thanks to one of its receivers sensitive to that wavelength. Given that all the signals propagate in the connection in the same direction, measures must be taken to avoid interference and conflicts at the level of the receivers. For example, a rule may be imposed whereby all the send wavelengths of the hub and of the stations are all different from each other. Time-division multiplexing may also be used for signals sent by a plurality of senders that would be carried by the same wavelength. Each station could include a receiver terminal and a sender terminal respectively consisting of a plurality of receivers and a plurality of senders tuned to a plurality of wavelengths.

Exchanges of information between stations are effected via the hub in the following manner. Each sender station sends the hub a signal carried by one of the receive wavelengths of the hub. That signal contains an address indicative of the destination station. After reception of the signal and its conversion to electrical form by the hub, the destination address is processed by the management means of the network to determine a receive wavelength of the destination station. The signal is then reconverted to optical form by means of a carrier wave having that wavelength and sent as a downlink signal.

All signals on the connection coming from the hub constitute information traffic known as "downlink" traffic and all signals on the connection coming from the stations constitute "uplink" information traffic.

In the embodiment shown diagrammatically in FIG. 1, the nodes ANi (where i is equal to 1, 2 or 3 in the example represented) each consist of a simple 2-to-2 type coupler. Each coupler has a first input connected to the upstream section FSi, a first output connected to the downstream section FSi+1, a second input connected to the senders TX of the associated station and a second output connected to the receivers RX of that station. Hereinafter, the first inputs and outputs are called the first and second "connection points" of the node to the connection and the second inputs and outputs are called first and second "access points" of the station to the connection.

Thus two adjacent sections FSi, FSi+1 are coupled to each other via a first channel of the 2-to-2 coupler, the upstream section FSi is coupled to the receiver terminals RX via a second channel, and the sender terminals TX are coupled to the downstream section FSi+1 via a third channel, these three channels enabling couplings that are not wavelength-selective.

Consequently, each station may insert into the downstream section signals produced by a variable number of senders TX, tuned to any wavelength. Similarly, for reception, each station may process a variable number of signals by providing the same number of photodetectors coupled to the outputs of means for filtering (or demultiplexing) signals received from the upstream section. It is therefore a simple matter to change the capacity of the network by adding senders and photodetectors, without disturbing traffic in transit through the node. Note that a plurality of stations can process the same channel, to enable the broadcasting of the same signal to a plurality of receivers of different stations.

This embodiment provides great flexibility in the choice of send and receive wavelengths.

In a second type of network (not shown) similar to the previous one, the uplink and downlink traffic are contra-directional, i.e. propagate in opposite directions. In this case, the senders and the receivers of the hub are coupled to the same end of the fiber, for example the end E1, and for the downlink traffic each node ANi performs the function of a "1-to-2" coupler from the hub, via the end E1 and the upstream sections, to the downstream section, on the one hand, and to the receiver terminal of the associated station, on the other hand. Conversely, for the upstream traffic of signals going from the sender terminal to the hub, each node ANi performs the function of a "2-to-1" coupler in the opposite direction, i.e. from the senders of the stations to the receivers of the hub, via the same end E1. It may be noted that the "1-to-2" and "2-to-1" coupling functions referred to above may be effected as in the preceding embodiment by means of a 2-to-2 type directional coupler of which only three ports are used, the senders TX and receivers RX of the associated station being connected to the same second access point. It may also be noted that this second type of network no longer has a ring physical topology but instead a tree topology. In this second type of network, the end E2 is not connected to the hub. In fact, all the senders and receivers of the hub are connected to the same end E1.

As in the first embodiment, the nodes provide couplings that are not wavelength-selective. This latter embodiment therefore has the same advantages in terms of the flexibility in the choice of send and receive wavelengths. It further enables the use of common wavelengths for carrying uplink and downlink traffic.

Other considerations must be taken into account in network design, however, in particular the design of transparent and passive networks.

An important aspect in the dimensioning of a network is the "power budget", i.e. the processing of the minimum permissible optical powers for the photodetectors of the receivers, and consequently the send powers to be provided and/or the maximum possible lengths of the connections between senders and receivers.

In this regard, the last embodiment mentioned has the advantage that it makes it possible to optimize the optical power budget by appropriate dimensioning of the coupling ratios of the various 1-to-2 couplers constituting the nodes of the network. For example, in the case of a network with no in-line amplification, the optimized coupling ratios may be calculated in the following manner.

There is taken as the minimum receive power a common value for all of the receivers of the network, that value being sufficiently high to take into account the spreads of the characteristics of the photodetectors and aging phenomena. Similarly, the senders in the same network are normally chosen to deliver substantially the same power, which also makes it possible to define a nominal send power value common to all the senders of the network.

Given these conditions, for a network having N nodes, for example, there will be chosen N couplers the N coupling ratios whereof have respective values such that the various optical paths via these couplers between the senders and receivers of the hub and the senders and receivers of the terminals have transmission coefficients having substantially the same common value. This is reflected in N equations in which the unknowns are the N coupling ratios and the parameters are the transmission coefficients of the elements constituting the network.

As the uplink and downlink traffic take the same paths, the coupling ratios are optimized for both types of traffic.

On the other hand, this kind of optimization is generally not possible in the case of the first network. In fact, except in special circumstances, if couplers are chosen the coupling ratios whereof are optimized for the downlink traffic, for example, the coupling ratios for the uplink traffic are then fixed, generally at non-optimum values, and vice-versa.

Another important aspect of network design relates to protection against faults or interruption of the connection.

In the case of ring topologies such as that of FIG. 1, prior art solutions are based on the use of a connection consisting of a plurality of optical fibers, which are normally part of the same cable.

One possibility is to provide two fibers respectively dedicated to uplink and downlink traffic, for example. The senders of the hub are then each coupled to the two ends of the fiber dedicated to downlink traffic so that the downlink signals propagate in the fiber in opposite directions. Similarly, the senders of each station are coupled to the fiber dedicated to uplink traffic at two connection points such that the uplink signals propagate in the fiber in opposite directions also.

Means are then provided in each station for routing received couples enabling each receiver to be selectively coupled to one or the other of the coupling points of the station to the fiber dedicated to downlink traffic. Similarly, the hub is provided with means for routing received signals for selectively coupling each of its receivers to one or the other of the two ends of the fiber dedicated to uplink traffic.

Accordingly, if a section of the ring is broken, appropriate switching of the routing means enables the exchanges of signals between the hub and each station to be maintained.

An alternative solution consists in duplicating the network by dedicating one fiber, called the "working" fiber, to the normal mode of operation and the other fiber, called the "protection" fiber, to the protection mode of operation.

There are then provided in the hub and in each station means for routing the signals sent that selectively couple according to the mode of operation each sender to one or the other of the fibers. There are similarly provided means for routing received signals that selectively couple each receiver to one or the other of the fibers.

The two networks advantageously each conform to the second type described hereinabove i.e. use as access nodes optimized 2-to-1 (or 1-to-2) couplers adapted to route bidirectional uplink and downlink traffic.

Given that the working and protection fibers normally belong to the same cable, a break occurring in one section generally leads to unavailability of both fibers in the same section. It will therefore be necessary in each station for the access couplers to the respective fibers to be disposed symmetrically. Thus, in protection mode the uplink and downlink traffic can always propagate between the hub and each station by using fiber sections that are not faulty (provided of course that only one section is faulty).

Although these solutions involving a plurality of fibers are effective in terms of protection, they lead to an overcost that it is desirable to be able to avoid.

To this end, there may be envisaged a protection system applied in the case of a single-fiber connection. The principle is analogous to the preceding situation, except for switching the coupling of the signals sent from one fiber to the other. There has to be used for each station an access node to the same fiber that consists either of a single 2-to-2 coupler or of two 2-to-1 couplers disposed symmetrically.

In the former situation, the coupling structure is that of the network from FIG. 1 with the drawback already indicated: it is generally not possible to dimension the couplers so that they have coupling ratios optimized both for traffic exchanged between each station and the first end E1 of the fiber, on the one hand, and between each station and the second end E2, on the other hand. The same drawback applies in the latter situation.

An object of the invention is to propose a solution enabling the implementation of a network in which are reconciled properties that are incompatible with the prior art networks described hereinabove, i.e. a network provided with a single-fiber connection, in a ring configuration enabling protection in the event of interruption at one point of the connection, and in which to access the fiber the stations use couplers having coupling ratios optimized both in the normal mode of operation and in the protection mode, i.e. both for traffic exchanged between each station and the first end E1 of the fiber, on the one hand, and between each station and the second end E2, on the other hand.

SUMMARY OF THE INVENTION

To this end, the invention consists firstly in an access node for optical transmission network, including first and second connection points, first and second access points, and a coupling device providing bidirectional coupling between, respectively:

said first connection and access points,
said second connection and access points, and
said first and second connection points,
characterized in that said coupling device comprises:
first and second band splitters, each band splitter being provided with first, second and third ports and providing selective bidirectional coupling of optical signals between its first port and said second or third ports, according to whether those signals are carried by wavelengths belonging to a first or a second spectral band,
a first coupler bidirectionally coupling the second port of the second band splitter, on the one hand, to the second port of the first band splitter via a first channel and, on the other hand, to said second access point via a second channel,
a second coupler bidirectionally coupling the third port of the first band splitter, on the one hand, to the third port of the second band splitter via a first channel and, on the other hand, to said first access point via a second channel.

The first and second spectral bands referred to are respectively adapted to include two different wavelengths, or more generally to contain separate first and second sets of wavelengths.

The invention also consists in an optical transmission network, the access nodes whereof conform to the above definition. More precisely, the network comprises at least one optical fiber connection divided into a plurality of sections separated by access nodes for terminals of associated stations, each access node providing bidirectional coupling between two adjacent sections and between said adjacent sections and at least one receiver and/or sender terminal of an associated station, first and second ends of said fiber connection being coupled to first and second interfaces, respectively, of a hub, characterized in that said access nodes conform to the node according to the invention, the first and second connection points of each access node being coupled to adjacent first and second sections, respectively, of said optical connection, and said associated station being coupled to said second and first access points.

Such a network is particularly adapted to optimization of the power budget. Thus the first connection point of each access node being coupled to that of said adjacent sections that is situated on the side of said first end, said first and second couplers of the access nodes have coupling ratios having respective values such that the various optical paths between said second or first end of the connection and said terminals via said first or second couplers have transmission coefficients having respective predefined values.

Each of these predefined values for a given optical path will be determined as a function of known values of the nominal receive and send optical powers respectively characteristic of the receivers and senders placed at the two ends of the optical path. This aspect will be explained in more detail hereinafter.

At least one of the first and second couplers of the coupling device is advantageously reconfigurable to enable adjustment of its coupling ratio. This feature makes it possible to take account of any changes to certain characteristics of the network (aging of components, insertion of new nodes or terminals, etc).

Other aspects and advantages of the access node according to the invention and the network incorporating it will become apparent in the light of the description with reference to the figures.

BRIEF DESCRIPTION OF THE DRAWINGS

FIG. 1, already commented on, represents diagrammatically one example of a prior art ring optical network.

FIG. 2 represents a first embodiment of an access node according to the invention.

FIG. 3 represents a second embodiment of an access node according to the invention, in the situation where the associated station is situated at a distance from the connection points of the node to the connection.

DETAILED DESCRIPTION OF PREFERRED EMBODIMENTS

An access node ANi according to the invention, associated with a station STi, is represented in FIG. 2. The station STi is schematically represented by a sender terminal TXi and a receiver terminal RXi.

The node is disposed between two adjacent sections FSi, FSi+1 of an optical fiber connection F of a ring optical network analogous to that of FIG. 1.

As already explained hereinabove, the access node includes two connection points for inserting it between the adjacent first and second sections FSi, FSi+1 of the fiber. The first connection point P1 is coupled to one end of the section FSi that is situated on the same side as the first end E1 of the connection F, for example. The second connection point P2 is then coupled to one end of the section FSi+1 situated on the same side as the second end E2 of the connection F.

The node further includes a first access point A1 and a second access point A2 adapted to be coupled to the sender terminal TXi and the receiver terminal RXi of the station.

In this embodiment, the access node simply consists of a coupling device Ci consisting of first and second band splitters BSa, BSb and first and second couplers CW and CP of the 2-to-1 (or 1-to-2) type disposed in a particular manner.

Each band splitter BSa or BSb is provided with first, second and third ports, respectively Ba, BWa, BPa for BSa, and Bb, BWb, BPb for BSb. Each splitter provides selective bidirectional coupling for optical signals between its first port Ba, Bb and its second port BWa, BWb or its third port BPa, BPb according to whether these signals are carried by wavelengths belonging to a first or second spectral band BW or BP. The band splitters therefore each have the same function of multiplexing/demultiplexing (at least) two bands of wavelengths.

They may be implemented in the conventional way, for example by means of a filter designed to reflect a first band BW and to transmit a second band BP. Wavelength band demultiplexers could also be used, which bands could be adjacent or made up of interleaved wavelengths.

A first coupler CW having the 1-to-2 function is disposed to couple the second port BWb of the second band splitter BSb, on the one hand, to the second port BWa of the first band splitter BSa via a first channel and, on the other hand, to the second access point A2 via a second channel. A second coupler CP also having the 1-to-2 function is disposed to couple the third port BPa of the first band splitter BSa, on the one hand, to the third port BPb of the second band splitter BSb via a first channel and, on the other hand, to the first access point A1 via a second channel.

The couplers CW and CP can be conventional 2-to-2 type directional couplers of which only three ports are used.

To implement the protection mechanism of a network provided with access nodes like that described hereinabove, two modes of operation are defined: a normal or "working" mode and a "protection" mode. The first spectral band BW and the first coupler CW, for example, are assigned to the working mode. The second spectral band BP and the second coupler CP are in this case assigned to the protection mode.

There is then provided at least one first or "working" wavelength included in the first spectral band BW and at least one other or "protection" wavelength included in the second spectral band BP.

Accordingly, to enable first of all the protection of uplink traffic, each station sender terminal TXi is adapted to produce uplink signals carried by at least one working wavelength $\lambda uwi$ and by at least one protection wavelength $\lambda upi$.

According to whether the terminal is in the working mode or the protection mode, each uplink signal is respectively carried by a working wavelength $\lambda uwi$ or a protection wavelength $\lambda upi$ and is respectively injected via the second access point A2 or via the first access point A1.

The hub is then adapted to detect the uplink signals carried by working wavelengths that are received via its second interface HR and those carried by the protection wavelengths that are received via its first interface HT.

For the practical implementation, station sender terminals TXi are provided that are equipped with laser sources for generating carrier waves having selected working and protection wavelengths. Wavelength-tunable sources may be used for this purpose, for example. Routing means are additionally provided, such as optical space switches SW, as shown diagrammatically in FIG. 2, for selectively coupling, according to the mode of operation, the uplink signals carried by the working wavelengths $\lambda uwi$ or those carried by the protection wavelengths $\lambda upi$ to the second access point A2 or to the first access point A1, respectively.

In a variant (not shown) that is functionally equivalent but necessitates no optical space switches and offers greater flexibility as to the number of usable send wavelengths, a plurality of senders may be provided a portion of which send on working wavelengths and another portion of which send on protection wavelengths. The senders assigned to the working wavelengths are then coupled to the second access point A2, advantageously via a first multiplexer dedicated to the working mode. In the same way, the senders assigned to the protection wavelengths are coupled to the first access point A1 via a second multiplexer dedicated to the protection mode. In this embodiment, the sender terminal operates in working mode or in protection mode according to whether the senders assigned to the working wavelengths or those assigned to the protection wavelengths are activated.

To enable the protection of the downlink traffic, the hub is adapted to produce and to send via its second interface HR signals carried by at least one working wavelength $\lambda dwi$ and via its second interface HT signals carried by at least one protection wavelength $\lambda dwi$.

If there is no fault on the connection, each downlink signal is carried by a working wavelength $\lambda dwi$ and is coupled via the second interface HR to the second end E2 of the connection.

If there is a fault at a point on the connection, a downlink signal intended for a given station will still be carried by a working wavelength and sent via the second interface HR if the fault is not situated between the second end E2 and the station. If this is not the case, the signal will be carried by a protection wavelength and sent via the first interface HT.

At the level of the stations, the protection of the downlink traffic implies that each receiver terminal RXi be adapted to detect signals carried by at least one working wavelength $\lambda dwi$ and at least one protection wavelength $\lambda dpi$, these working and protection wavelengths obviously being among those that the hub is adapted to use for sending.

If there is no fault on the connection, each downlink signal comes from the second access point A2 and is carried by a working wavelength $\lambda dwi$. The same applies in the event of a fault if the fault is not situated between the second end E2 and the station.

On the other hand, if the fault is situated between the second end E2 and the station, each downlink signal comes from the first access point A1 and is carried by a protection wavelength $\lambda dpi$. The receiver terminal RXi is therefore placed in the protection mode in order to detect the downlink signals received by the first access point A1.

For the practical implementation of the receiver terminals RXi, there may be provided for each signal a photodetector associated with a tunable filter for selectively transmitting its working wavelength or its protection wavelength. The tunable filter (not shown) is coupled to the two access points P1 and P2 by a 2-to-1 coupler, for example, or selectively by an optical space switch SW' as shown here.

In a variant (not shown) that is functionally equivalent but does not necessitate any tunable filters, there may also be provided a plurality of receivers a portion of which is formed of receivers tuned to the working wavelengths and another portion of which is formed of receivers tuned to the protection wavelengths. The second access point A2 is then coupled to the receivers assigned to the working wavelengths via a first demultiplexer adapted to separate the working wavelengths. In the same way, the first access point A1 is coupled to the receivers assigned to the protection wavelengths via a second demultiplexer adapted to separate the protection wavelengths. In this embodiment, the receiver terminal operates in working mode or in protection mode according to whether the receivers tuned to the working wavelengths or those tuned to the protection wavelengths are activated.

It may be noted that this embodiment is well adapted to the embodiment of the sender terminal referred to above. In fact, the first and second demultiplexers are advantageously the same components as the first and second multiplexers, respectively, dedicated to the working mode and the protection mode, respectively, of the senders.

Thanks to the particular design of the access node according to the invention, whereby the values of the coupling ratios of the couplers CW and CP may be chosen independently, it is possible for a network equipped with such access nodes to apply the optimization criteria referred to hereinabove to each of the couplers.

The coupling ratios of the first couplers CW of the various stations of the network will typically have respective values such that the various optical paths between the second end E2 of the connection F and the sender terminals TXi and the receiver terminals RXi of the respective stations via these first couplers CW have transmission coefficients having respective predefined values. In the same way, the coupling ratios of the second couplers CP of the various stations will have respective values such that the various optical paths between the first end E1 of the connection F and the sender terminals TXi and the receiver terminals RXi of the respective stations via these second couplers CP have transmission coefficients also having respective predefined values.

Each of these predefined values for a given optical path is determined as a function of known values of the nominal receive and send optical powers respectively characteristic of the receivers and the senders placed at the two ends of the optical path. In linear magnitudes, for a given optical path, the ratio of these powers corresponds, for a given propagation direction, to a first or minimum permissible transmission coefficient value and to a second or minimal permissible value for the opposite propagation direction. In this case, the predefined transmission coefficient value corresponding to that optical path will be chosen to be greater than and preferably substantially equal to the greater of these two minimum values. Applying this rule optimizes the use of the power resources.

In the relatively common particular case in which the nominal receive and send powers have respective common values, the respective predefined values of the transmission coefficients will have substantially the same common value.

Then knowing these predefined values of the transmission coefficients, as well as the individual transmission coefficients of the various elements constituting the network (other than the couplers), it is possible to deduce therefrom the corresponding optimum values of the coupling ratios of the couplers. It should be noted that these individual transmission coefficients may be either attenuations (coefficients less than 1) or gains (coefficients greater than 1) if the optical paths include amplifiers.

FIG. 3 shows a variant of the access node according to the invention that is applied in the situation where the associated station STi is situated at a distance from the connection points P1, P2 of the node to the connection.

The node includes a coupling device Ci identical to that of the preceding embodiment and a third band splitter BSc.

The band splitter BSc is similar to the band splitters BSa and BSb of the coupling device Ci. It is therefore also provided with first, second and third ports Bc, BWc, BPc and also provides selective bidirectional coupling of optical signals between its first port Bc and its second or third ports BWc, BPc, according to whether those signals are carried by wavelengths belonging to the first or the second spectral band. It second and third ports BWc, BPc are additionally coupled to the second and first access points A2, A1, respectively, of the coupling device Ci.

To connect a distant station, here shown diagrammatically by the terminals RXi and TXi, there may be used an access fiber L and a fourth band splitter BSd identical to the previous three, also with first, second and third ports Bd, BWd, BPd, respectively. One end of the fiber L is coupled to the first port Bc of the third band splitter BSc and the other end of the fiber L is coupled to the first port Bd of the fourth band splitter BSd.

Accordingly, vis a vis the station STi, the second and third ports BWd, BPd of the band splitter BSd play the same roles as the second and first access points A1, A2, respectively, of the node from FIG. 2.

The invention is not limited only to the embodiments described hereinabove. In particular, the invention may equally well be applied to passive networks and to networks having connections provided with amplifiers that should normally be bidirectional.

Similarly, the invention may be applied to networks using any type of wavelength division multiplexing: dense wavelength division multiplexing (DWDM) or coarse wavelength division multiplexing (CWDM).

There is claimed:

1. An access node for optical transmission network, including a first connection point and a second connection point, a first access point and a second access point, and a coupling device providing bidirectional coupling between, respectively:
  the first connection point and the first access point,
  the second connection point and the second access point, and
  the first connection point and the second connection point,
  which coupling device comprises:
  a first band splitter and a second band splitter, each band splitter being provided with a first port, a second port and a third port and providing selective bidirectional coupling of optical signals between its first port and said second or third ports, according to whether those signals are carried by wavelengths belonging to a first or a second spectral band,
  a first coupler bidirectionally coupling the second port of the second band splitter, on the one hand, to the second port of the first band splitter via a first channel and, on the other hand, to said second access point via a second channel, so that the second access point forms an optical input and an optical output of the access node,
  a second coupler bidirectionally coupling the third port of the first band splitter, on the one hand, to the third port of the second band splitter via a first channel and, on the other hand, to said first access point via a second channel, so that the first access point forms an optical input and an optical output of the access node.

2. An access node according to claim 1, wherein at least one of said first and second couplers is reconfigurable to enable adjustment of its coupling ratio.

3. An access node according to claim 1, including a third band splitter similar to said first second band splitters and also provided with first, second and third ports its second and third ports being coupled to said second and first access points, respectively.

4. An optical transmission network comprising at least one optical fiber connection divided into a plurality of sections separated by access nodes for terminals of associated stations, each access node providing bidirectional coupling between two adjacent sections and between said adjacent sections and at least one receiver and/or sender terminal of an associated station, first and second ends of said fiber connection being coupled to first and second interlaces, respectively, of a hub, wherein said access nodes are nodes according to claim 1, the first and second connection points of each access node being coupled to adjacent first and second sections, respectively, of said optical connection, and said associated station being coupled to said second and first access points.

5. A network according to claim 4, wherein the first connection point of each access node being coupled to that of said adjacent sections that is situated on the side of said first end, said first and second couplers of the access nodes have coupling ratios having respective values such that the various optical paths between said second or first end of the connection and said terminals via said first or second couplers have transmission coefficients having respective predefined values.

6. A network according to claim 5, wherein said respective predefined values of the transmission coefficients have substantially the same common value.

7. A network according to claim 4, wherein at least one station includes a sender terminal adapted to produce signals carried by at least one working wavelength belonging to said first spectral band and by at least one protection wavelength belonging to said second spectral band and the hub is adapted to detect signals received via its second and first interfaces and carried by said working and protection wavelengths, respectively.

8. A network according to claim 4, wherein at least one station includes a receiver terminal adapted to detect signals carried by at least one working wavelength belonging to said first spectral band and by at least one protection wavelength belonging to said second spectral band and the hub is adapted to produce and to send via its second and first interfaces, respectively, signals carried by said working and protection wavelengths, respectively.

* * * * *